(12) United States Patent
Kunisch et al.

(10) Patent No.: US 7,371,996 B2
(45) Date of Patent: May 13, 2008

(54) ROLLER-EQUIPPED ANNEALING LEHR

(75) Inventors: Clemens Kunisch, Armsheim (DE);
Armin Vogl, Jena (DE); Andreas Morstein, Jena (DE)

(73) Assignee: Schott AG, Mainz (DE)

( * ) Notice: Subject to any disclaimer, the term of this patent is extended or adjusted under 35 U.S.C. 154(b) by 32 days.

(21) Appl. No.: 11/588,562

(22) Filed: Oct. 27, 2006

(65) Prior Publication Data

US 2007/0107468 A1    May 17, 2007

(30) Foreign Application Priority Data

Oct. 29, 2005    (DE)    ............... 10 2005 051 879

(51) Int. Cl.
*F27B 9/24*    (2006.01)
*F27B 9/36*    (2006.01)
*F27B 9/40*    (2006.01)

(52) U.S. Cl. .............. 219/388; 219/483; 219/486; 65/162

(58) Field of Classification Search ............ None
See application file for complete search history.

(56) References Cited

U.S. PATENT DOCUMENTS

| | | | | |
|---|---|---|---|---|
| 3,508,899 A | * | 4/1970 | Ward ............... | 65/162 |
| 3,744,985 A | * | 7/1973 | Peternel ............ | 65/162 |
| 4,824,464 A | * | 4/1989 | Perin et al. ........ | 65/118 |
| 5,122,180 A | * | 6/1992 | Mathivat et al. ..... | 65/162 |
| 5,337,393 A | * | 8/1994 | Reunamaki .......... | 219/388 |
| 5,864,119 A | * | 1/1999 | Vogt et al. ......... | 219/388 |
| 6,018,144 A | * | 1/2000 | Vogt et al. ......... | 219/388 |
| 6,172,336 B1 | * | 1/2001 | Vehmas .............. | 219/388 |
| 6,204,483 B1 | | 3/2001 | Fair et al. | |

FOREIGN PATENT DOCUMENTS

EP    1 491 509    12/2004

* cited by examiner

*Primary Examiner*—J. Pelham
(74) *Attorney, Agent, or Firm*—Michael J. Striker

(57) ABSTRACT

A roller-equipped annealing lehr for flat glass, having a roller conveyor inside a lehr housing, with heating units arranged in pairs above and below the roller conveyor, in rows situated one after another and extending transversely to the feed direction. Temperature regulators are provided with predetermined desired values and actual temperature values that are measured in a position-dependent fashion. In order to achieve a desired stable temperature distribution and to prevent stresses in the flat glass, a feedback loop arrangement for at least one pair of heating units situated at a particular position in the row, presets as a control variable the heating output required to predetermine the temperature distribution in the region of this position as a predetermined portion of a heating output, which is calculated based on at least one actual temperature value measured at a different position in the row.

18 Claims, 3 Drawing Sheets

ROLLER-EQUIPPED ANNEALING LEHR

PRIOR ART

Figure 1:
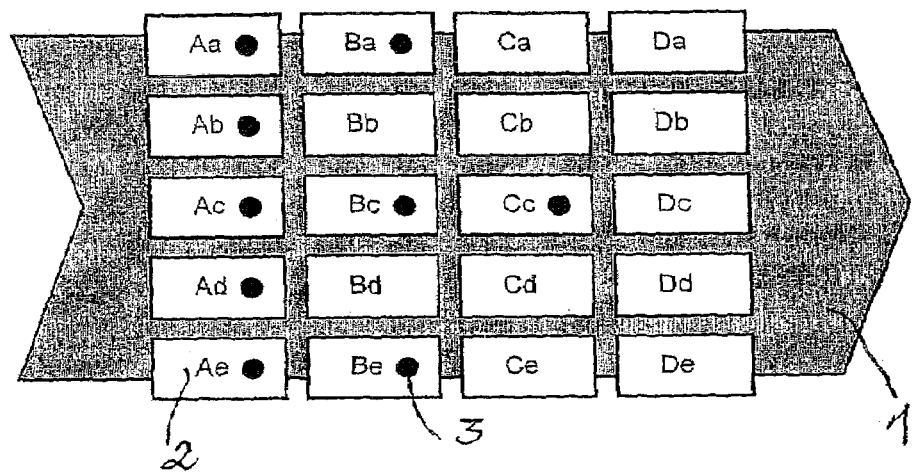

The invention relates to a roller-equipped annealing lehr for flat glass, having a roller conveyor, which is accommodated inside a lehr housing, and having heating units that are arranged in pairs above and below the roller conveyor, in rows situated one after another and extending transversely to the feed direction, and are associated with temperature regulators provided with actual temperature values measured in a position-dependent fashion and predetermined associated desired values in order to preset a desired temperature distribution.

Roller-equipped annealing lehrs in which the temperature difference between the hot forming of the respective glass product and the ambient temperature is overcome during the relaxation of the glass product are used widely in the glass industry. For example, a thin, flat glass manufactured using the float process, after being formed in the float bath, passes through a roller-equipped annealing lehr in the form of a continuous glass ribbon.

Then the cooled, relaxed flat glass is processed in a product-specific way. For example, the floated glass ribbon is cut into conventional rectangular panes.

Roller-equipped annealing lehrs typically have a lehr housing with an inlet opening and outlet opening for the flat glass, and a motor-driven roller conveyor accommodated therein, which is able to transport the flat glass—in particular embodied in the form of a glass ribbon—through the lehr. The roller conveyor has a multitude of rollers situated one after another in parallel fashion.

For example, each roller can be driven via a worm gear by a central motor and adjacent rollers can be coupled to one another via articulated shafts in the form of two universal joints.

It is also conceivable to associate each roller or a respective group of rollers with a separate drive unit so that the glass products can be transported at different speeds in the associated zones of the roller-equipped annealing lehr.

The roller-equipped annealing lehr is also provided with a multitude of heating units whose output per unit area decreases continuously from the entry of the flat glass into the roller-equipped annealing lehr to the exit of the flat glass from the roller-equipped annealing lehr. As a rule, the heating units are situated in both the upper part of the lehr, where they heat the top surface of the flat glass, and the lower part of the lehr, from which they heat the bottom surface of the flat glass.

The resulting mechanical stresses in the cooled flat glass largely depend on the temperature distribution in the roller-equipped annealing lehr. To that end, the heating units arranged parallel and transversely to the feed direction can be controlled separately in order to set a favorable temperature distribution parallel to and transverse to the feed direction in the annealing lehr in a manner that is favorable for the respective flat glass, e.g. the floated glass ribbon. For a high-quality glass, it is particularly important for the temperature distribution transverse to the travel direction of the flat glass, i.e. from one edge to the other in the net area of a glass ribbon, to be as homogeneous as possible.

The temperature distribution in the roller-equipped annealing lehr is a result of the heat transported along by the flat glass and the heating output of the heaters. The latter are usually controlled by means of a regulating unit for the heating output, which evaluates the differences between the predetermined desired temperature distribution and the measured actual temperature profile. To that end, temperature measuring instruments, e.g. thermocouples or pyrometers, are situated above and below the glass ribbon.

EP 1 491 509 A1 has disclosed such a roller-equipped annealing lehr, having electrically operated resistance heating strips situated above and below the flat glass, transverse to the feed direction, and covering the width of the flat glass. In addition, a heating with approx. 650° C. hot compressed air is provided by means of tubes that extend over the width of the flat glass and have outlet openings spaced preset distances apart from one another. Along the resistance strips, five equidistantly spaced thermocouples are provided, whose output signals are supplied to a regulating/control unit for determining the actual temperature distribution, which regulating/control unit contains a stored preset temperature profile and whose outputs are connected to inputs of the resistance strips and to a blower for the hot compressed air.

The known case uses a special heating output distribution to prevent the sinking of the glass edge regions that typically occurs at the beginning of the heating of the flat glass. To that end, as the flat glass enters the roller-equipped annealing lehr, the resistances of the upper resistance strip are triggered in a controlled fashion according to a predetermined temperature profile, independent of the signals of the thermocouples, while the resistances of the lower resistance strip are set in a position-dependent, regulated fashion based on the ACTUAL value signals of the thermocouples. In a typical control temperature profile, the control unit supplies the upper resistance heaters in the middle region of the flat glass ribbon with 100% of the electrical power, whereas it supplies the heating segments in the edge region with a lower amount of power. Accordingly, the airflow of the blower for the additional hot compressed air is operated at maximum in the beginning of the heating and is then throttled down over the course of the rest of the heating.

After the heating, the resistances of the heating strips are supplied with electrical energy individually in accordance with the difference between the locally measured ACTUAL temperature signal and the predetermined desired signal.

U.S. Pat. No. 6,204,483 B1 has disclosed a similar roller-equipped annealing lehr in which instead of a large number of statically situated thermocouples for detecting the ACTUAL temperature distribution, particularly in the direction transverse to the feed direction, only a single temperature measuring instrument is provided, which is moved transversely to the feed direction and detects the local temperatures one after another. The heating units in the form of infrared emitters arranged in rows are likewise regulated individually as a function of the local temperature conditions.

If this conventional embodiment of heating output regulation—in which each heater is associated with precisely one temperature measurement signal as a local actual value—is used on all of the heaters of the roller-equipped annealing lehr, then this yields usable temperature distributions in the flat glass (glass ribbon) parallel to the pulling direction.

When used on all of the heaters of the roller-equipped annealing lehr, though, this occasionally leads to unfavorable temperature distributions in the flat glass (glass ribbon) transverse to the pulling direction and leads to the ensuing poor production results if the temperature differences transverse to the pulling direction or from "top to bottom" are low in relation to the measurement precision of the absolute value of the actual temperature. The latter can cause some heaters to emit a large quantity of heat while other heaters situated adjacent to or above/below them give off a small quantity of heat or no heat at all. This usually occurs when the detected temperature difference between the temperature signals is less than the precision of the instrument.

The object of the invention is to embody the roller-equipped annealing lehr of the type indicated at the beginning with respect to the heating regulation so that the desired temperature distribution occurs for a long time.

In a roller-equipped annealing lehr for flat glass, having a roller conveyor, which is accommodated inside a lehr housing, and having heating units that are arranged in pairs above and below the roller conveyor, in rows situated one after another and extending transversely to the feed direction, and are associated with temperature regulators provided with actual temperature values measured in a position-dependent fashion and predetermined associated desired values, this object is attained according to the invention by virtue of the fact that a feedback loop arrangement is provided, which, for at least one pair of heating units situated at a particular position in the row, presets as a control variable the heating output required to predetermine the temperature distribution in the region of this position as a predetermined portion of a heating output, which is calculated based on at least one actual temperature value measured at a different position in the row.

The step taken according to the present invention permits long-lasting achievement of the desired temperature distribution in the roller-equipped annealing lehr and therefore also in the transported flat glass, with correspondingly favorable production results.

Embodiments and modifications of the present invention are disclosed in the dependent claims and ensue from the description of the drawings.

The invention will be described in detail below in conjunction with embodiments of the invention shown in the drawings.

Figure 2:
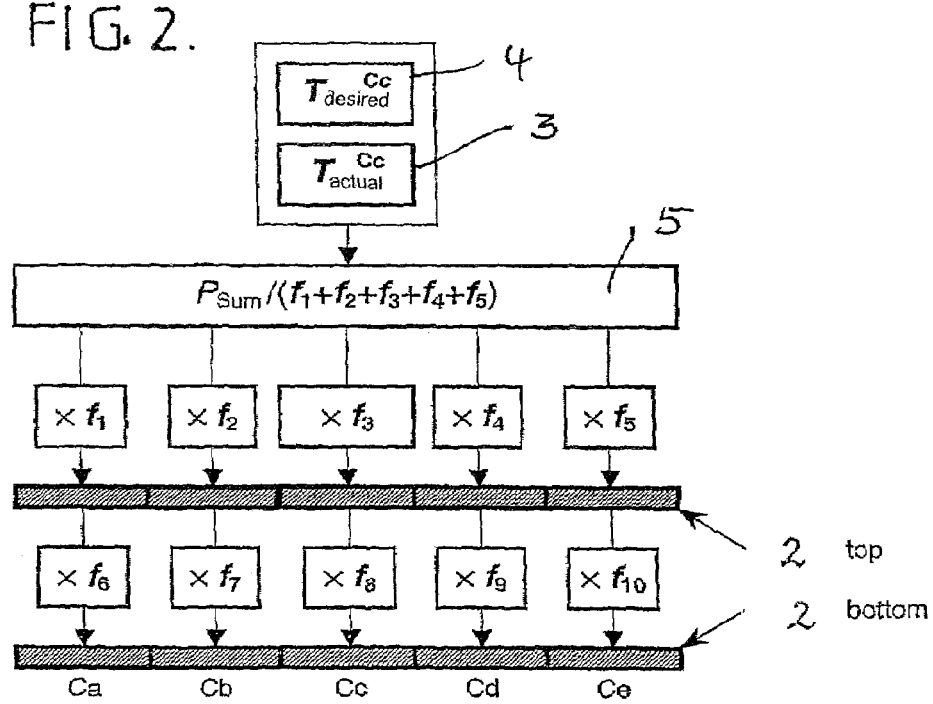
Figure 3:
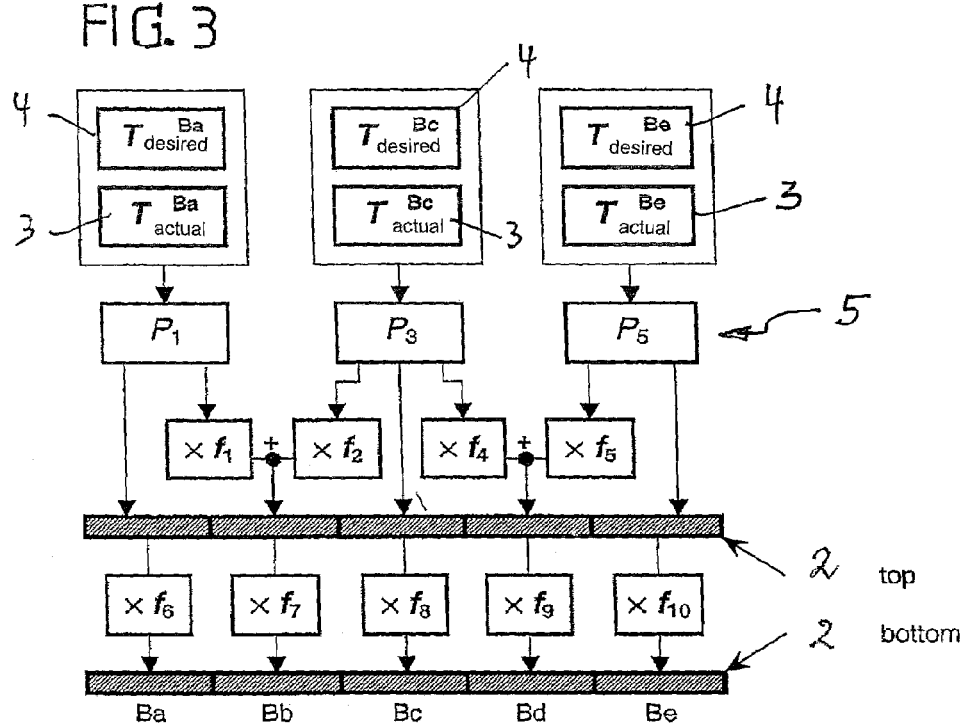
Figure 4:
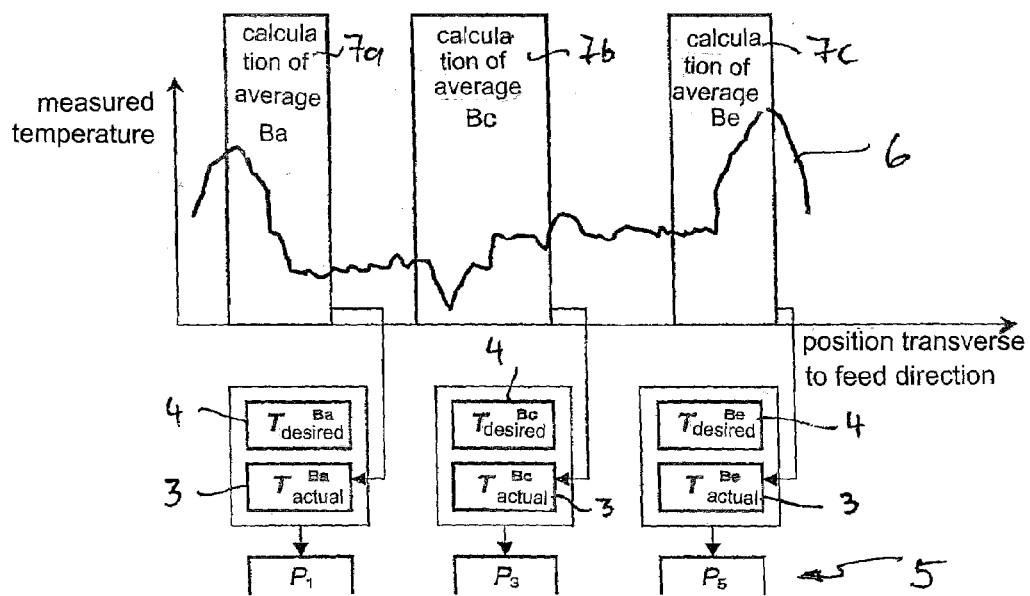
Figure 5:
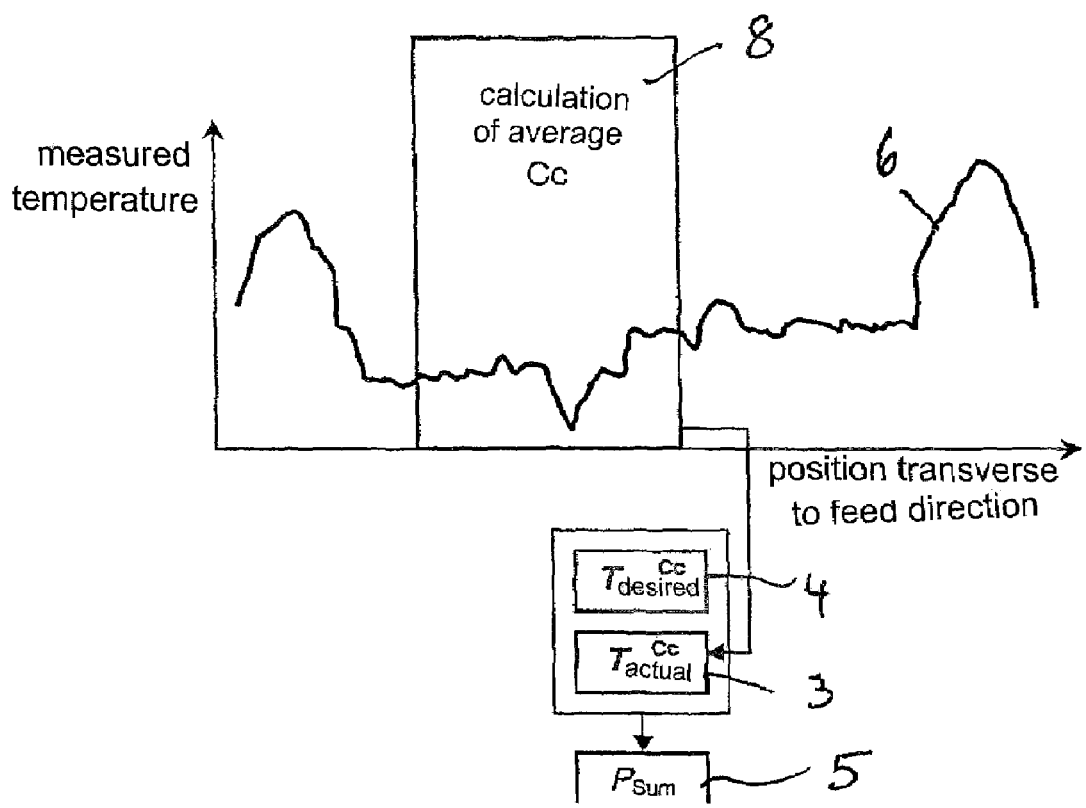

FIG. 1 is a schematic top view of a glass ribbon, which is transported in the arrow direction through a roller-equipped annealing lehr, in connection with heating units that are arranged in a checkerboard pattern and are regulated according to the invention, FIG. 2 shows a block circuit depiction of the control diagram of a first embodiment of the heating regulation according to the invention, with only one regulator for all of the heaters of one row extending transversely to the transport direction, FIG. 3 shows a block circuit diagram of the control diagram of a second embodiment of the heating regulation according to the invention, with three regulators for all of the heaters of one row extending transversely to the transport direction, FIG. 4 shows a graph of the temperature curve over a row transverse to the transport direction, measured by a temperature measuring instrument that is moved or scans along the row, and the ascertainment of three actual temperature values for the regulator according to FIG. 3, and FIG. 5 shows, in a graph analogous to FIG. 4, the ascertainment of only one actual temperature value for the regulator according to FIG. 2.

FIG. 1 of the drawings schematically depicts a glass ribbon 1 transported in the arrow direction through the roller-equipped annealing lehr, in connection with heating units in the form of conventional heaters 2 of the roller-equipped annealing lehr, which, labeled Aa through De, are arranged in rows one after another, above and below the glass ribbon 1. The glass ribbon typically has a thickness of =1.2 mm, preferably =0.8 mm.

Usually, a feedback loop for the heating output adjusts the heaters 2 based on temperature measurements. To that end, temperature measuring instruments 3, e.g. thermocouples or pyrometers, are situated above and below the glass ribbon 1. These temperature measuring instruments 3 are symbolically depicted by solid black circles in FIG. 1. They are the actual value generators for the associated feedback loops.

In a conventional arrangement of the heating output regulation, each heater 2 is associated with precisely one temperature measuring instrument 3 as an actual value generator. The respective heating output is calculated from the actual temperature measured by the associated temperature measuring instrument 3 and from the predetermined desired temperature, as depicted in FIG. 1 for the heaters 2 labeled Aa through Ae. This embodiment complies with the requirement that for a high-quality glass, it is important for the temperature distribution transverse to the travel direction of the glass ribbon to be as homogeneous as possible.

If the above-mentioned embodiment were used on all of the heaters 2 of the roller-equipped annealing lehr, then this would in fact yield usable temperature distributions in the glass ribbon parallel to the pulling direction, e.g. as depicted by means of the heaters 2 labeled Ac-Bc-Cc, but if it were used on all of the heaters 2 of the roller-equipped annealing lehr transverse to the pulling direction, e.g. in the heaters 2 labeled Aa-Ab-Ac-Ad-Ae, then this would occasionally lead to unfavorable temperature distributions in the glass ribbon and ensuing poor production results if the temperature differences transverse to the pulling direction, i.e. in a row or from "top to bottom", are low in relation to the measurement precision of the absolute value of the actual temperatures. The latter can cause some heaters 2 to give off a large quantity of heat while other heaters adjacent to or above/below them give off a small quantity of heat or no heat at all. In a corresponding trial, the following resulting heating output distribution could be measured for the heaters 2 labeled Aa through Ae: desired temperatures

| desired temperatures | | | | | |
| --- | --- | --- | --- | --- | --- |
| top [° C.] | 675 | 680 | 680 | 680 | 675 |
| bottom [° C.] | 675 | 680 | 680 | 680 | 675 |

| temperature measurement | | | | | |
| --- | --- | --- | --- | --- | --- |
| top [° C.] | 675.0 | 679.7 | 679.9 | 680.3 | 673.4 |
| bottom [° C.] | 674.6 | 680.2 | 678.7 | 679.9 | 681.9 |

| heating output | Aa | Ab | Ac | Ad | Ae |
| --- | --- | --- | --- | --- | --- |
| top [kW] | 8.7 | 6.2 | 9.3 | 0.3 | 27.4 |
| bottom [kW] | 23.1 | 18.0 | 0.4 | 17.0 | 0.3 |

The different heating outputs in the heaters 2, however, yield different actual (not measured) temperatures in the thin glass ribbon 1, which, due to the mechanism of thermally induced linear expansion, cause mechanical stresses in the thin glass ribbon, which remain partially present in the panes of glass after cutting.

The step according to the present invention can achieve the desired temperature distribution in a long-lasting fashion in the roller-equipped annealing lehr and therefore also in the transported glass ribbon, with correspondingly favorable production results.

To implement the step according to the invention, there are a series of conceivable embodiments that should first be explained in conjunction with the following principal exemplary embodiments:

FIRST EXEMPLARY EMBODIMENT

This example taken from FIG. 1 takes into consideration the adjacent heaters 2 situated above (=top) and below (=bottom) the roller conveyor in a row transverse to the feed direction—the heaters labeled Ca-Cb-Cc-Cd-Ce in this instance—i.e. heaters 2 with only one temperature measuring instrument 3 at heater Cc. These heaters are associated with a shared feedback loop, having a control diagram according to FIG. 2, having the single temperature measuring instrument 3 as an actual value generator, having a desired value generator 4 that the system operator sets to a predetermined desired value, and having a regulator 5 that calculates the sum $P_{sum}$ of the heating outputs of the above-mentioned heaters 2—which outputs are required for achieving the desired temperature distribution in the associated regions of the glass ribbon and are identified with the numbers $f_1$ through $f_{10}$ preset by the system operator—and that presets the control variables Pca-Pce for the individual heaters as a fixed portion of the sum of the heating outputs $P_{sum}$, both for the top heaters 2 situated above the roller conveyor and for the bottom heaters 2 situated below the roller conveyor.

The numbers $f_1$ through $f_5$ indicate the proportionate output distribution "P" transverse to the pulling direction for the top heaters 2. The total heating output is distributed to the five heaters as follows:

$$P_{Ca}^{top}=f_1 P_{sum}/(f_1+f_2+f_3+f_4+f_5)$$

$$P_{Cb}^{top}=f_2 P_{sum}/(f_1+f_2+f_3+f_4+f_5)$$

$$P_{Cc}^{top}=f_3 P_{sum}/(f_1+f_2+f_3+f_4+f_5)$$

$$P_{Cd}^{top}=f_4 P_{sum}/(f_1+f_2+f_3+f_4+f_5)$$

$$P_{Ce}^{top}=f_5 P_{sum}/(f_1+f_2+f_3+f_4+f_5)$$

The factors $f_6$ through $f_{10}$ indicate the bottom/top output ratio (the bottom and top heating outputs are equal for the numerical value 1).

$$P_{Ca}^{bottom}=f_6 P_{Ca}^{top}$$

$$P_{Cb}^{bottom}=f_7 P_{Cb}^{top}$$

$$P_{Cc}^{bottom}=f_8 P_{Cc}^{top}$$

$$P_{Cd}^{bottom}=f_9 P_{Cd}^{top}$$

$$P_{Ce}^{bottom}=f_{10} P_{Ce}^{top}$$

In the trial, this exemplary embodiment yielded the resulting concrete heating output distribution shown below:

| desired temperatures | | | | | |
|---|---|---|---|---|---|
| top [° C.] | — | — | 600 | — | — |
| bottom [° C.] | — | — | — | — | — |

| temperature measurement | | | | | |
|---|---|---|---|---|---|
| top [° C.] | 591.3 | 597.1 | 599.9 | 596.1 | 593.1 |
| bottom [° C.] | 571.0 | 578.1 | 581.0 | 578.4 | 574.6 |

| heating output | Ca | Cb | Cc | Cd | Ce |
|---|---|---|---|---|---|
| top [kW] | 6.7 | 6.3 | 6.7 | 6.3 | 6.7 |
| bottom [kW] | 6.7 | 6.3 | 6.7 | 6.3 | 6.7 |

The measured temperature distribution corresponded to the preset.

This principle can essentially be used for any "row" of heaters 2 situated transverse to the feed direction.

SECOND EXEMPLARY EMBODIMENT

Expanding on the basic concept of the first exemplary embodiment provides another conceivable embodiment in which associated regulators calculate the heating outputs for the adjacent heaters 2 in a transverse row based on the actual temperature in the middle of the glass ribbon 1 and the actual temperature at the two edges of the glass ribbon 1.

The heaters labeled Ba-Bb-Bc-Bd-Be, with the temperature measuring instruments 3 in the heaters Ba, Bc, and Be, are used as an example. Associated regulators calculate the heating outputs of the heaters Ba, Bc, and Be based on the actual temperatures measured at these locations and based on the respective desired temperatures.

FIG. 3 shows the associated control diagram, embodied in a form analogous to the one in FIG. 2. Three actual value generators 3 measure three temperatures as actual values. In the three desired value generators 4, the system operator presets three associated desired temperatures as well as ten factors $f_1$ through $f_{10}$ in accordance with the desired temperature distribution. The regulator 5 first determines intermediate values $P_1$, $P_2$, $P_3$, and based on them, the individual outputs $P^{top}$ for the heaters 2 (Ba-Be) situated above the roller conveyor are determined as follows:

$$P_{Ba}^{top}=P_1$$

$$P_{Bb}^{top}=f_1 P_1+f_2 P_3$$

$$P_{Bc}^{top}=P_3$$

$$P_{Bd}^{top}=f_4 P_3+f_5 P_5$$

$$P_{Be}^{top}=P_5$$

The factors $f_6$ to $f_{10}$ indicate the bottom/top output ratio (the bottom and top heating outputs are equal for the numerical value 1).

$$P_{Ba}^{bottom}=f_6 P_{Ba}^{top}$$

$$P_{Bb}^{bottom}=f_7 P_{Bb}^{top}$$

$$P_{Bc}^{bottom}=f_8 P_{Bc}^{top}$$

$$P_{Bd}^{bottom}=f_9 P_{Bd}^{top}$$

$$P_{Be}^{bottom}=f_{10} P_{Be}^{top}$$

According to this, the partial outputs of the heaters Ba, Bc, Be that are provided with a feedback loop and actual value generators 3 correspond to the intermediate values $P_1$, $P_3$, $P_5$ determined in the respective feedback loop, whereas the partial output of the heaters Bb and Bd that are not provided with an actual value generator are proportionally calculated from the intermediate values for the adjacent heaters. Thus the heating output for the heater Bb is calculated in a fixed ratio ($f_1$, $f_2$) based on the heating outputs of the heaters Ba and Bc. Correspondingly, the heating output for the heater Bd is calculated in a fixed ratio ($f_4$, $f_5$) based on the heating outputs of the heaters Bc and Be and is adjusted by means of a corresponding control variable in the feedback loop. It is thus possible to avoid unwanted differences between the heating outputs Ba, Bb, and Bc or the heating outputs Bc, Bd, and Be, as indicated below by the resulting heating output distribution, which is likewise empirically recorded:

| desired temperatures | | | | | |
|---|---|---|---|---|---|
| top [° C.] | 711 | — | 712 | — | 709 |
| bottom [° C.] | — | — | — | — | — |

| temperature measurement | | | | | |
|---|---|---|---|---|---|
| top [° C.] | 710.7 | 716.0 | 712.3 | 714.2 | 709.0 |
| bottom [° C.] | 713.9 | 723.8 | 720.6 | 722.5 | 719.3 |

| heating output | Ba | Bb | Bc | Bd | Be |
|---|---|---|---|---|---|
| top [kW] | 29.9 | 11.1 | 6.3 | 7.8 | 13.7 |
| bottom [kW] | 29.9 | 11.1 | 6.4 | 7.8 | 13.8 |

This principle can be used for any transverse row in FIG. 1 or can be "mixed" with the principle underlying the first exemplary embodiment.

The heater feedback loops in FIGS. 2 and 3 are constructed by conventional means. The regulators typically have a microprocessor for calculating heating outputs.

In the two exemplary embodiments described above, the actual value of the heater feedback loops is respectively preset by a separate actual value generator 3, e.g. by means of a thermocouple or pyrometer installed in stationary fashion in the roller-equipped annealing lehr.

It is, however, also conceivable not to embody the temperature measuring instrument as a stationary device, but instead to embody it as a pyrometer that is moved or that scans in linear fashion, transverse to the feed direction, and that detects the local temperatures in the respective "row" one after another. FIGS. 4 and 5 show the temperature curves thus detected for the two exemplary embodiments described above.

From the signal of the temperature curve, an evaluation circuit situated after the pyrometer derives the actual values for the feedback loops according to FIGS. 2 and 3 in a position-dependent fashion by calculating an average.

Thus for the embodiment 2 according to FIG. 3, the three actual values—namely the actual value for the heating regulation Ba in position block 7a, the actual value for the heating regulation Be in position block 7b, and the actual value for the heating regulation Be in position block 7c of the temperature curve 6—are determined according to the depiction in FIG. 4.

For the embodiment 1 according to FIG. 2, the single actual value for the heating regulation Cc in the middle temperature block 8 of the temperature curve is correspondingly determined in the manner shown in FIG. 5.

The temperature regulation with a measured actual value preset does not absolutely have to be carried out in every "row"; instead, the control diagram can also be embodied so that from the measured actual values for one "row" and heating outputs that are calculated based on them, for other heaters, which are situated in a row following the measured heaters of the one "row" in the feed direction, are calculated and preset as fixed components. Therefore the total output $P_{D,sum}$ for the heaters of the "row" D, which follows the "row" 3 measured according to the second embodiment (FIGS. 3 and 4), is calculated from the relation:

$$P_{Dsum} = f_{B?D} \times (P_1 + P_3 + P_5).$$

Accordingly, the calculated total output $P_{Dsum}$ for the row C measured according to the first embodiment (FIGS. 2 and 5), is calculated from the relation:

$$P_{D,sum} = f_{C?D} \times P_{sum,C}.$$

In both instances, the factors $f_{B?D}$ and $f_{C?D}$ are preset.

The output $P_{D,sum}$ calculated for row D is divided up in accordance with FIG. 2.

In the hot region of the roller-equipped annealing lehr, it has turned out to be useful to mathematically derive the control variables for only one "row" from the preceding, measured row. In the cooler region, the result of the measured row can be extrapolated to several subsequent rows.

What is claimed is:

1. A roller-equipped annealing lehr for flat glass (1), having a roller conveyor, which is accommodated inside a lehr housing, and having heating units (2) that are arranged in pairs above and below the roller conveyor, in rows situated one after another and extending transversely to the feed direction, and are associated with temperature regulators provided with actual temperature values that are measured in a position-dependent fashion and predetermined associated desired values wherein a feedback loop arrangement (3, 4, 5) is provided, which, for at least one pair of heating units (2) situated at a particular position in the row, presets as a control variable the heating output required to predetermine the temperature distribution in the region of this position as a predetermined portion of a heating output, which is calculated based on at least one actual temperature value measured at a different position in the row.

2. The roller-equipped annealing lehr as recited in claim 1, wherein only one heating regulator (5) with only one actual temperature value (3) is provided for all of the heating units (2) situated in a row and the regulator of the feedback loop arrangement (5) is embodied so that it calculates the sum of the heating outputs for the combined heating units (2) of the row and predetermines a fixed portion of this sum as a control variable for each heating unit (2) of the row.

3. The roller-equipped annealing lehr as recited in claim 2, wherein in a first subroutine, the regulator (5) uses first preset factors ($f_1$-$f_5$) to calculate a respective portion of the heating output for the heating units (2) situated above the roller conveyor and presets this as a control variable, and, in a second subroutine, the regulator (5) uses second preset factors ($f_6$-$f_{10}$) to calculate and preset a respective portion of the heating output for the heating units (2) situated below the roller conveyor.

4. The roller-equipped annealing lehr as recited in claim 2,
wherein the actual temperature value signal is associated with the heating unit (2) situated in the middle of the row.

5. The roller-equipped annealing lehr as recited in claim 1, wherein for the heating units (2) situated in one row, a feedback loop arrangement (5) with at least two regulating steps is provided, each with a respective measured actual temperature value.

6. The roller-equipped annealing lehr as recited in claim 5, wherein three regulating steps are provided, each with a respective measured actual temperature value; one of these regulating steps is associated with the middle heating units (2) and is supplied with an actual temperature value measured in the middle region while the other two regulating steps are associated with heating units in the lateral edge regions and are each supplied with a respective actual temperature value measured in the respective edge region.

7. The roller-equipped annealing lehr as recited in claim 5,
wherein the heating regulating steps of the feedback loop arrangement (5) calculate the heating output for the heating units (2) directly associated with them and directly preset it as a control variable; the feedback loop arrangement (5) calculates and presets the heating outputs for the heating units (2) situated between the regulated heating units (2) based on the sum of preset portions of the heating outputs of adjacent, regulated heating units (2).

8. The roller-equipped annealing lehr as recited in claim 7, having a separate regulation, as recited claim 3, of the heating units situated above and below the roller conveyor.

9. A roller-equipped annealing lehr in which its embodiment, as recited in claim 2, is provided for all of the rows of heating units (2) situated after one another in the feed direction.

10. The roller-equipped annealing lehr as recited in claim 1,
wherein a temperature measuring instrument (3), which is embodied in the form of a thermocouple mounted in stationary fashion, is provided for the position-dependent detection of the actual temperature value.

11. The roller-equipped annealing lehr as recited in claim 1,
wherein a temperature measuring instrument, which is embodied in the form of a pyrometer mounted in stationary fashion, is provided for the position-dependent detection of the actual temperature value.

12. The roller-equipped annealing lehr as recited in claim 1,
wherein the temperature measuring instrument is embodied in the form of a pyrometer, which is moved transverse to the feed direction and in so doing, detects the local temperatures one after another.

13. The roller-equipped annealing lehr as recited in claim 1,
wherein the temperature measuring instrument is embodied in the form of a pyrometer, which scans transverse to the feed direction and in so doing, detects the local temperatures one after another.

14. The roller-equipped annealing lehr as recited in claim 12,
wherein the temperature measuring instrument has an evaluation stage that presets the position-dependent actual temperature values by calculating an average of the detected temperature signal in the region of the respective position.

15. The roller-equipped annealing lehr as recited in claim 2,
wherein the regulator (5) is embodied so that based on the heating outputs respectively calculated for one row, it presets the heating outputs for the heating units, which are situated in at least one row in the feed direction after the measured heating units, as predetermined portions of the control variable.

16. The roller-equipped annealing lehr as recited in claim 1,
having a roller conveyor for transporting a flat glass with a thickness of=1.2 mm.

17. The roller-equipped annealing lehr as recited in claim 16, having a roller conveyor for transporting a flat glass with a thickness of=0.8 mm.

18. The roller-equipped annealing lehr as recited in one claim 1,
wherein the flat glass is embodied in the form of a continuous glass ribbon.

* * * * *

UNITED STATES PATENT AND TRADEMARK OFFICE
CERTIFICATE OF CORRECTION

PATENT NO. : 7,371,996 B2
APPLICATION NO. : 11/588562
DATED : May 13, 2008
INVENTOR(S) : C Kunisch, A Vogl and J Morstein Page 1 of 1

It is certified that error appears in the above-identified patent and that said Letters Patent is hereby corrected as shown below:

Column 10, Line 37 delete "=" and substitute '≤'

Column 10, Line 40 delete "=" and substitute '≤'

Signed and Sealed this
Twenty-sixth Day of March, 2013

Teresa Stanek Rea
*Acting Director of the United States Patent and Trademark Office*